United States Patent
Robieu

(10) Patent No.: US 7,946,353 B2
(45) Date of Patent: May 24, 2011

(54) POWER TOOL HAVING A TRANSMISSION VENT

(75) Inventor: Thomas Robieu, Schwaikheim (DE)

(73) Assignee: AEG Electric Tools GmbH, Winnenden (DE)

( * ) Notice: Subject to any disclaimer, the term of this patent is extended or adjusted under 35 U.S.C. 154(b) by 59 days.

(21) Appl. No.: 12/477,398

(22) Filed: Jun. 3, 2009

(65) Prior Publication Data

US 2009/0301746 A1     Dec. 10, 2009

(30) Foreign Application Priority Data

Jun. 4, 2008  (EP) ..................................... 08010192

(51) Int. Cl.
 *B25F 5/02*  (2006.01)

(52) U.S. Cl. .............. 173/171; 173/217; 173/2; 173/16; 173/48

(58) Field of Classification Search ................. 173/171, 173/217, 2, 16, 48
See application file for complete search history.

(56) References Cited

U.S. PATENT DOCUMENTS

| | | | | |
|---|---|---|---|---|
| 3,376,939 A | * | 4/1968 | Jakob | 173/201 |
| 3,929,195 A | * | 12/1975 | Stiltz et al. | 173/109 |
| 4,183,414 A | * | 1/1980 | Tamai et al. | 173/118 |
| 4,298,073 A | * | 11/1981 | Yates | 173/198 |
| 4,487,271 A | * | 12/1984 | Pomeroy et al. | 173/29 |
| 4,611,670 A | | 9/1986 | Chromy | |
| 4,858,701 A | * | 8/1989 | Weyer | 173/50 |
| 5,492,183 A | * | 2/1996 | Sollami | 173/216 |
| 5,873,418 A | * | 2/1999 | Arakawa et al. | 173/212 |
| 7,032,683 B2 | * | 4/2006 | Hetcher et al. | 173/1 |
| 7,331,408 B2 | * | 2/2008 | Arich et al. | 173/201 |
| 2007/0007024 A1 | * | 1/2007 | Tokairin et al. | 173/48 |
| 2009/0126964 A1 | * | 5/2009 | Schroeder et al. | 173/217 |

FOREIGN PATENT DOCUMENTS

| | | |
|---|---|---|
| DE | 27 09 616 A1 | 9/1978 |
| DE | 196 28 946 A1 | 1/1998 |
| DE | 20 2004 019045 | 3/2005 |
| EP | 1252976 A | 10/2002 |
| EP | 1655110 A | 5/2006 |

OTHER PUBLICATIONS

European Search Report; Application No. 08010192.6-1262; AEG Electric Tools GmbH.

* cited by examiner

*Primary Examiner* — Brian D Nash
(74) *Attorney, Agent, or Firm* — Knobbe, Martens, Olson & Bear, LLP

(57) ABSTRACT

A power tool, such as a hammer drill and/or a chiseling hammer, includes a lubricated transmission arranged in a sealed transmission box. The transmission box is in fluid connection with the atmosphere via a venting channel. A sealing element is arranged in the venting channel. The sealing element cooperates with the venting channel to create a meandering pathway for air to pass through the venting channel so that leakage of lubricant between the sealing element and the venting channel is at least substantially prevented.

8 Claims, 2 Drawing Sheets

POWER TOOL HAVING A TRANSMISSION VENT

RELATED APPLICATION

This application is related to, and claims priority from, European Patent Application No. 08 010 192.6, filed Jun. 4, 2008, entitled "POWER TOOL HAVING A TRANSMISSION VENT," the entirety of which is incorporated by reference herein and made a part of the present specification.

BACKGROUND OF THE INVENTION

1. Field of the Invention

The present invention concerns a power tool, preferably a hammer drill or a chipping hammer comprising a lubricated transmission arranged in a sealed transmission box, in particular in an air-tight transmission box, wherein the transmission box is in fluid connection with the atmosphere via a venting channel, and an air-permeable sealing element arranged in the venting channel.

2. Description of the Related Art

Such a power tool is, for example, known from EP 1 252 976 A1, wherein the transmission box is open towards the atmosphere via a narrow channel and a filter connecting to this channel. The filter element may, for example, be a felt.

If the transmission is lubricated by oil or an oil-like lubricant, there is the danger that the felt soaks up the oil through capillary action and that the transmission starts to leak after a short time (oil leakage by capillary action). A similar problem arises also when using grease or grease-like lubricants. Here, the felt works similar to a sieve and separates the grease into its components. The base oil is soaked up by the felt through capillary action, whereas the soaps from the grease remain sticking on the surface of the felt and form a thick layer. This layer seals the felt so that a further loss of lubricant is avoided but at the same time no more venting of the transmission housing is warranted. However, the venting is necessary because the air pressure within the transmission housing of the hammer drill or chipping hammer is subject to continuous oscillations due to changes in temperature and the operation of the hammer mechanism, and a pressure compensation with the atmosphere has to be provided.

SUMMARY OF THE INVENTION

In view of the above discussion, it is an object of the present invention to further develop a power tool of the specified type so that a secure and permanent venting without any substantial loss in lubricant may be ensured.

This object is achieved by the features of one or more embodiments of the claimed invention. Further preferred embodiments are defined in the dependent claims.

A preferred embodiment of the present invention is based upon the notion to provide a meander-like sealing element in the path or channel taken by the air for the pressure compensation of the transmission box towards the atmosphere, which upon over- or underpressure allows air to circulate in the transmission box by extending the path from the transmission box to the outside, without any lubricant leaking from the transmission by capillary action.

Thus, the power tool, which preferably is a hammer drill or a chipping hammer, comprises a lubricated transmission arranged in a sealed transmission box, in particular in a substantially air-tight transmission box, wherein the transmission box is in fluid connection with the atmosphere via a venting channel, and an air-permeable sealing element arranged in the venting channel, which upon over- or underpressure in the transmission box allows air to circulate between the atmosphere and the transmission box. According to the invention, this sealing element is configured so as to extend the venting channel meander-like so that the air may continue to circulate but lubricant is prevented from leaking from the transmission box to the atmosphere by-passing the sealing element. Preferably, the sealing element may be formed of rubber or a rubber-like material.

According to a particularly preferred embodiment, the venting channel comprises an aperture open to the transmission box, wherein it is preferred that the sealing element substantially immediately adjoins the aperture. Thereby, leakage of lubricant from the transmission box is substantially avoided without the need for additional elements or laborious structures in order to seal other regions of the venting channel against leakage of the lubricant.

A particularly economical and space-saving construction may be achieved if the power tool comprises a switching member, preferably a transmission switch, wherein the switching element preferably has a socket (stub or boss) protruding into the transmission box, within which the venting channel having the sealing element is formed. To operate the power tool, such a switching element is operable from the outside so as to switch a component in the interior of the power tool. Thus, such a switching element is an interface between the interior of the power tool and the environment and, therefore, the atmosphere. This interface may be configured as leaky (untight or unsealed) location and may be utilized for forming the venting channel in a space-saving and economical way. Here, a transmission switch is particularly preferred. For example, this can be used to switch between a hammer drill mode and a chipping hammer mode or, conversely between a pure drill mode and a hammer drill mode. Here, there may be a mechanical connection between the switching element and one or more transmission elements. In other words, there is a connection between the switch and the transmission box so that substantially no additional elements may to be provided in order to form the venting channel.

According to a particularly preferred embodiment the sealing element is configured in a way that it has a mouth opening facing the transmission box, that is an opening open directly or indirectly towards the transmission box. Further, two flow channels continuing from the mouth opening are provided so that air flowing out of the transmission box upon overpressure, for example, may flow into the mouth opening and from there flow in different directions into the two separate flow channels. This is especially expedient in order to avoid an accumulation of lubricant, for instance an accumulation of grease. In case of an accumulation of grease in the mouth opening, in a situation of overpressure the accumulated grease is pushed out of the mouth opening into only one of the two flow channels, so that there always remains a flow channel for air to flow through. This contributes to a reliable and secure venting.

Further, it is preferred that the sealing element comprises at least one, but preferably several levels (or stages) respectively composed of at least one (preferably only one) mouth opening leading into the respective level and two flow channels continuing from the mouth opening. By arranging several levels connected in series and configured in this manner, the above-mentioned advantage regarding the prevention of an accumulation of grease and a secure and reliable venting is ensured and, on the other hand, it is avoided that the lubricant (accumulated grease) finds its way to the point of leaking out of the power tool.

Advantageously, the sealing element, which as mentioned may be made of rubber or a rubber-like material, may be molded, in particular injection-molded. In order to realize the above-mentioned configuration of mouth openings and continuing flow channels being arranged in several levels in the easiest way and at low production costs, it is hence preferred that the sealing element comprises several grooves sequentially arranged in direction of the venting channel. In other words, the sealing element comprises several grooves that are circumferentially arranged perpendicular to a longitudinal axis of the venting channel and distanced in the longitudinal direction of the venting channel. These grooves respectively form the mentioned flow channels and are separated by walls that are circumferentially arranged perpendicular to the longitudinal direction of the venting channel and distanced in the longitudinal direction of the flow channel. These walls each comprise a through hole, preferably only one through hole which forms the mouth opening. The wall is penetrated completely from one side to the other in the longitudinal direction of the venting channel so that by means of the through hole a connection between two grooves or flow channels that are adjacent in the longitudinal direction of the venting channel is created. These through holes are alternately provided on opposite sides of the sealing element, for example a front- and backside, so that a rectilinear flow from one through hole into the next is not possible. Here, it is also conceivable that the through holes or mouth openings are not arranged centrally in the walls and on the corresponding sides but are arranged in the walls and offset in an arbitrary manner.

Moreover, it is preferred that the walls seal circumferentially against the venting channel in a substantially air-tight manner so that neither a flow of lubricant nor a flow of air is permitted between the surface of the walls and the inner surface of the venting channel and past the sealing element. In order to achieve this, it may be preferred to provide a sealing lip surrounding the walls except for the through holes, or several sealing lips arranged in parallel.

Further advantages and features of the present invention, that may be employed on its own or in combination within a power tool according to the present invention, are apparent from the following description of a preferred embodiment given with reference to the accompanying drawings.

DETAILED DESCRIPTION OF THE PREFERRED EMBODIMENTS

Figure 1:
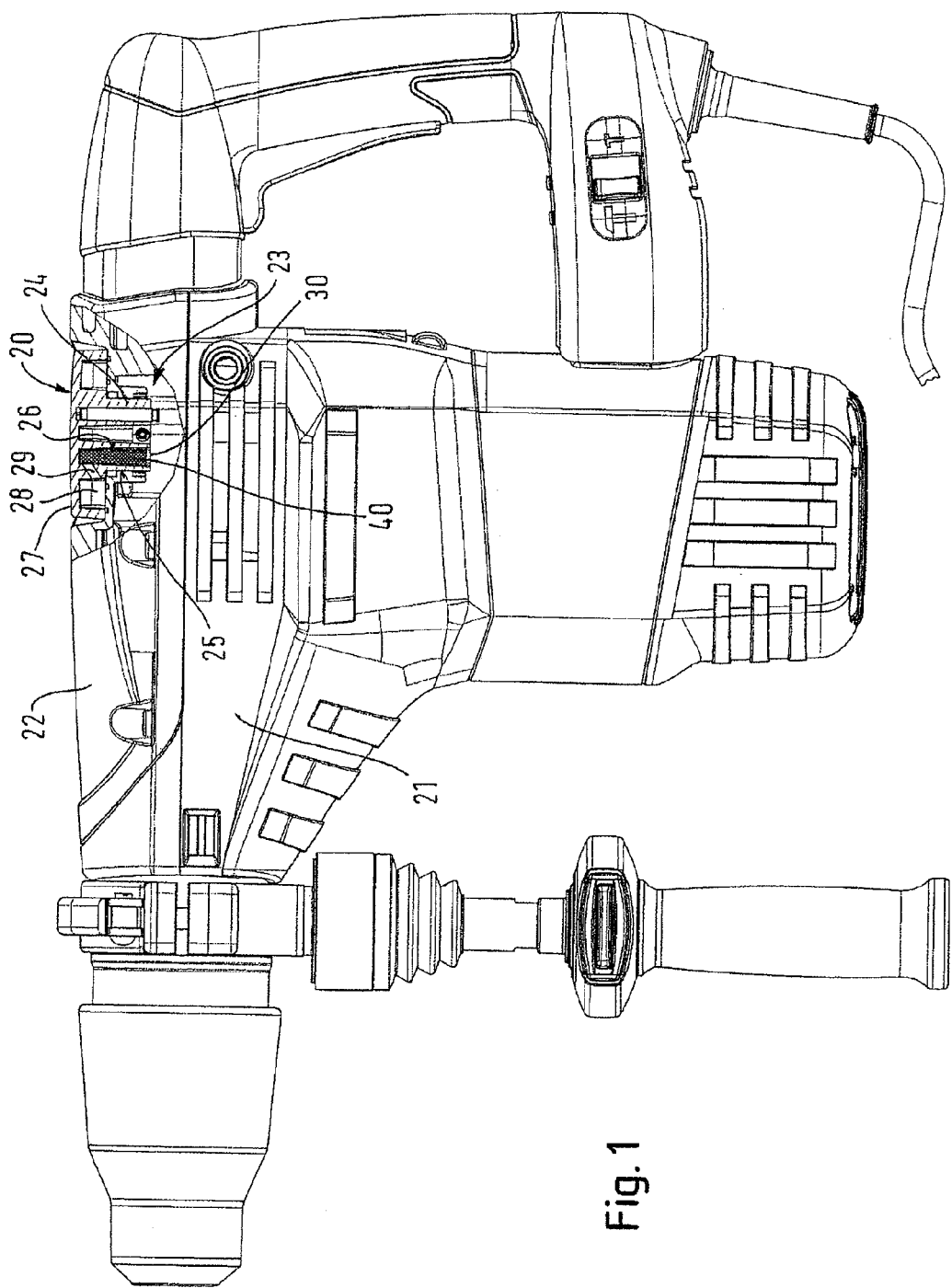
FIG. 1 shows a side view of a power tool according to the invention, which is broken open in the region of the venting channel having the sealing element.

The illustrated power tool is a hammer drill and chiseling hammer comprising an electric motor (not shown) as drive unit, which offers a hammer drill or chiseling hammer function through a transmission (not shown). It is possible to switch between a hammer drill mode and chiseling hammer mode by means of a transmission switch 20. By virtue of a mechanical connection with the transmission, the transmission switch causes either the transmission of the rotational motion of the electric motor to the drill chuck (hammer drill mode) or causes a corresponding removal of this rotational motion (chipping hammer mode). The mechanical connection and the switching of the transmission is insubstantial for the present invention and, therefore, will not be explained in more detail. The transmission is received in a transmission housing which in the embodiment shown consists of a housing body 21 and a lid 22. A transmission box 23 is formed in the housing 21, 22, which in the present case houses an oil-lubricated transmission (not shown). Due to temperature changes during operation as well as the hammer function of the hammer mechanism, pressure oscillations are created in the transmission box 23 during the operation of the power tool. In other words, an over- or underpressure may be created, which can only be compensated to the atmosphere. To that end the transmission switch 20 comprises a socket (stub) 24 seated in a recess 25 of the lid 22 of the transmission housing and, at the same time, fixed on the lid 22 of the transmission housing in a rotatable manner via latching connections (not shown).

The interface between the outer surface of the socket (stub) 24 and the inner surface of the opening 25 is configured in a substantially tight manner (against the lubricant and air). Further, the transmission switch 20 comprises a handling member 27 that can be grasped in order to operate the transmission switch 20. Facing the lid 22 of the transmission housing, a cavity 28 is provided in this handling member 27, which is formed by a recess in the handling member 27 and is closed by a surface of the transmission housing lid 22. However, In this case an air passage is provided between the lid 22 of the transmission housing or its outer surface and the support surface of the handling member 27 surrounding the space 28. Moreover, a venting channel 26 is provided in the socket 24, which communicates with space 28 via a connecting bore 29 (see also FIG. 2*c*). The venting channel 26 has an aperture 30 leading into the transmission box 23. By virtue of the fluid connection between the space 28 and the atmosphere via the interface between the handling member 27 and the outer surface of the lid 22 of the transmission housing, a fluid connection exists between the atmosphere and the transmission box 23 via space 28, bore 29 and venting channel 26.

Figure 2:
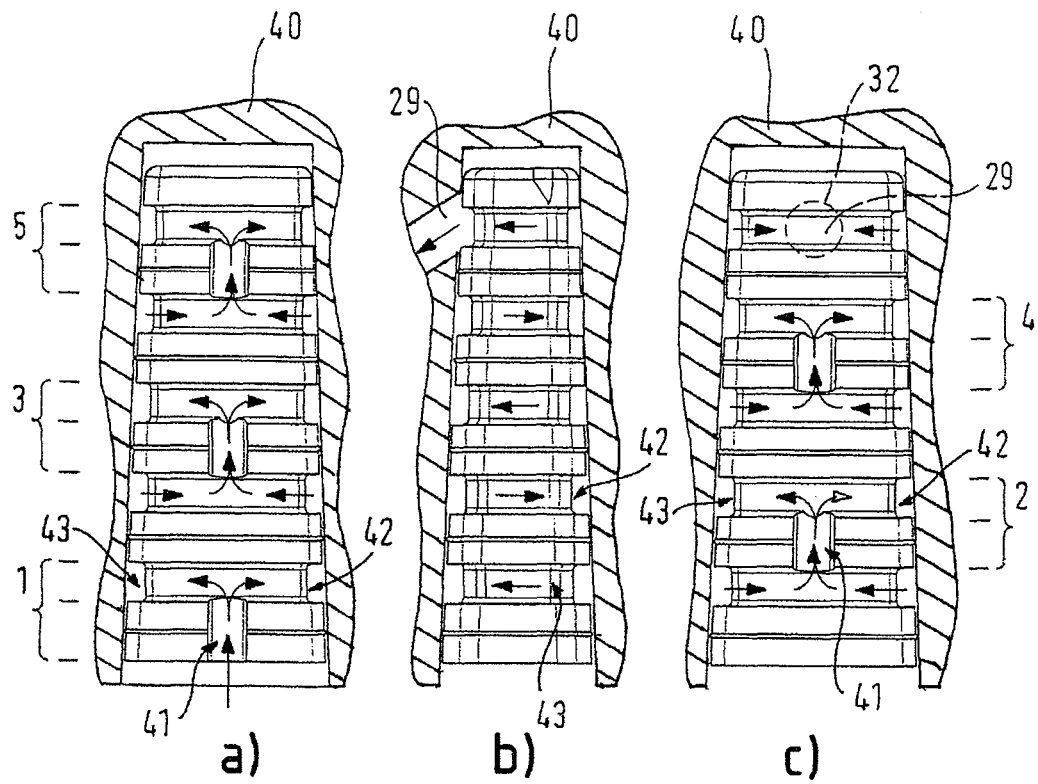
FIG. 2 shows an enlarged view of the venting channel having the sealing element arranged therein, corresponding to the illustration of FIG. 1, seen from the front in FIG. 2*a*, from a side in FIG. 2*b*, and from behind in FIG. 2*c*.
Figure 3:
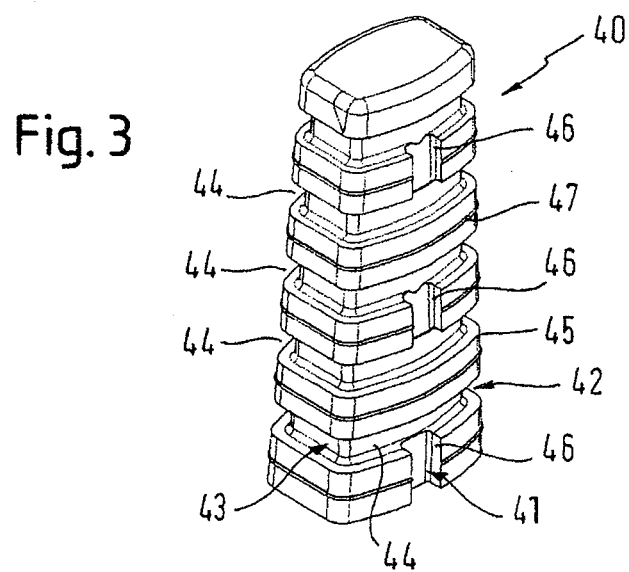
FIG. 3 shows a perspective view only of the sealing element of FIGS. 1 and 2.

Substantially immediately adjoining the aperture 30, a sealing element 40 is seated in the venting channel 26, which will be explained in more detail below by referring to FIG. 3. The sealing element 40 is preferably made of rubber or a rubber-like material and is, in the illustrated arrangement, molded, for example injection-molded. It is tapered from an end facing the aperture 30 toward the opposite end and the venting channel 26 illustrated in FIGS. 1 and 2 is configured in the same way, that is tapering away from the aperture 30. In particular, this is predetermined by the transmission switch 20, which is an injection-molded part, so that the tapered shape of the recess forming the venting channel 26 is necessary for demolding. The sealing element is seated in a force-fitting or friction-fitting manner within the venting channel so that no additional fastening is necessary.

At the broader end, the sealing element 40 comprises a mouth opening 41. In the assembled state, this mouth opening 41 is arranged on the side of the sealing element 40 facing the aperture 30 and, thus, the transmission box 23. Two flow channels 42, 43 continue from this mouth opening 41.

The sealing element 40 of the illustrated embodiment further comprises five levels 1-5 (see FIG. 2), which respectively consist of a mouth opening 41 and the two flow channels 42, 43 continuing from the mouth opening 41.

The sealing element 40 is formed by several grooves 44 forming the flow channels 42, 43 and arranged circumferentially and perpendicularly to the longitudinal direction of the sealing element 40. The grooves 44 are distanced from each other in the longitudinal direction of the sealing element 40 and are separated from each other by walls 45. The walls are configured circumferentially and perpendicular to the longitudinal direction of the sealing element 40 and comprise a through hole 46 each in the longitudinal direction. The perforation (through hole) of the walls is configured so as to connect two of the grooves 44 at a time. The through hole 46 provided closest to the transmission box 23, that is at the stronger end of the sealing element 40, connects the first groove 44 via aperture 30 to the transmission box 23 and is, therefore, the mouth opening facing the transmission box. As can be seen in particular from FIGS. 2a and *c*, the through holes 46 of neighboring walls 45 are provided diametrically opposite to each other on opposing sides of the sealing element 40. The through holes 46, however, do not necessarily have to be arranged on neighboring walls 45 in a diametrically opposite manner, that is offset by 180°, but may also be offset in a different arrangement.

Moreover, at least one sealing lip 47 is circumferentially provided, except for the through holes 46, on the surface of walls 45, which seals the walls 45 circumferentially against the inner walls of the venting channel 26 so that leakage of air and lubricant between the outer surfaces of the walls 45 and the inner surface of the venting channel 26 is avoided.

In the following, with particular reference to FIGS. 2a-c, the mode of operation of the vent will be explained. This explanation is given for an overpressure present in the transmission box 23 and is correspondingly inverted for respective underpressure. When there is overpressure in the transmission box 23, air in the transmission box 23 flows into the aperture 30 of the venting channel 26 and from there into the mouth opening 41 closest to the aperture 30 at an end of the sealing element 40. As indicated by the arrows in FIG. 2a, the inflowing air divides in the two flow channels 42, 43 after leaving the mouth opening 41 and flows into the mouth opening 41 of the second level, too, and from there in turn into two flow channels 42, 43 running perpendicular to the longitudinal direction of the venting channel 26 and the sealing element 40. From there, it in turn flows into the mouth opening 41 of the third level and the associated flow channels 42, 43. This is repeated on the fourth level until the air flows into the mouth opening 41 of the fifth level, and from there into the associated flow channels 42, 43, meeting In the region of an opening 32 leading into the bore 29, so that the air may escape through the bore 29 into the space 28 and from there towards the atmosphere. Thereby, a pressure compensation between the transmission box 23 and the atmosphere is ensured. Due to the significantly longer flow path of the air through the maze created by means of the mouth openings 41 and the flow channels 42, 43 on the different levels and due to the offset arrangement of the mouth opening 41 on the front and back side, a leakage of lubricant or a passage into the bore 29, the space 28 and from there out of the housing of the power tool is minimized or at least substantially or completely avoided.

With grease lubrication, if an accumulation of grease should form in the mouth opening closest to the transmission box 23, for example, it would eventually leave the mouth opening 41 in the direction of the atmosphere upon further overpressure and would eventually enter into one of the two flow channels 42 or 43, too. Even in such a case, however, the second flow channel would still be available for venting and the air can still escape via this channel from the mouth opening 41 of the first level to the mouth opening 42 of the second level and from there further via the third to fifth levels, the bore 29 and the space 28 towards the atmosphere, so that a secure and reliable venting is provided for without entailing a leakage of lubricant due to capillary action.

The inventive sealing element thus features numerous advantages. On the one hand, it can be economically produced. On the other hand, the placement and configuration in the transmission switch can easily be realized in a space-saving manner and without the integration or implementation of further elements or configurations. Without having to renounce these advantages, the sealing element of the present invention provides a secure and reliable venting without the risk of a leakage of lubricant and, thus, achieves the economical and space-saving replacement of the known filter as sealing element.

However, it is to be understood that the present invention is not limited to the illustrated embodiment but that various modifications within the scope of the patent claims may be effected. For example, the grooves 44 and thus the flow channels 42, 43 do not necessarily and unconditionally have to run perpendicular to the longitudinal extension of the venting channel 26 and/or of the sealing element 40 but may also be formed in an inclined manner or be composed of longitudinally and transversely extending elements or portions. Also, the mouth openings 41 formed by the through holes 46 do not necessarily have to run in the longitudinal direction but may also be inclined. As mentioned, the through holes 41 also do not necessarily have to be provided diametrically opposite to each other on different sides and alternately in the walls 45, but may be configured so as to be offset in various ways. Further, one can do without the configuration of the sealing lips 47 if the surfaces of the walls 45 suitably seal with the inner surface of the flow channel 26, which would, however, lead to a more difficult assembly (more effort) and smaller tolerances would need to be maintained. Finally, the venting channel does not necessarily have to be integrated in a switching element and/or the sealing element does not necessarily have to be seated in the venting channel of the switching element. For example, it is conceivable to provide in the lid 22 of the transmission housing, a suitable socket which leads into the transmission box 23 and communicates with the atmosphere, and in which the venting channel having the sealing element would then be provided. Also, the transmission does not necessarily have to be oil-lubricated, but a lubrication by grease and/or another oil-like or grease-like lubricant or any other lubricant could be used, too. Moreover, further modifications which allow the implementation of the present invention will be apparent to the skilled person.

What is claimed is:

1. A power tool, comprising:
   a lubricated transmission arranged in a sealed transmission box;
   a venting channel that provides a fluid connection between the transmission box and the atmosphere; and
   a sealing element arranged in the venting channel;
   wherein the sealing element cooperates with the venting channel to define a meandering pathway for air to move through the venting channel so that leakage of lubricant between the sealing element and the venting channel is at least substantially prevented, and wherein the sealing element has a mouth opening on the side facing the transmission box and two flow channels continuing from the mouth opening.

2. The power tool of claim 1, wherein the sealing element substantially immediately adjoins an opening of the venting channel into the transmission box.

3. The power tool of claim 1, further comprising a switching element having a socket protruding into the transmission box, in which the venting channel having the sealing element is formed.

4. The power tool of claim 3, wherein the switching element is a transmission switch.

5. A power tool, comprising:
- a lubricated transmission arranged in a sealed transmission box;
- a venting channel that provides a fluid connection between the transmission box and the atmosphere; and
- a sealing element arranged in the venting channel;
- wherein the sealing element cooperates with the venting channel to define a meandering pathway for air to move through the venting channel so that leakage of lubricant between the sealing element and the venting channel is at least substantially prevented, and wherein the sealing element comprises several levels, each comprising a mouth opening leading into the respective level and two flow channels continuing from the mouth opening.

6. The power tool of claim 5, wherein the sealing element comprises several grooves arranged in series in the longitudinal direction of the venting channel, each forming the flow channels, and wherein a through hole forming the mouth openings is formed in each of the walls separating the grooves, wherein the through holes of adjacent levels are alternately provided on opposite sides of the sealing element.

7. The power tool according to claim 6, wherein the walls circumferentially seal against the venting channel substantially air-tight manner.

8. The power tool of claim 7, wherein a circumferential sealing lip for the circumferential sealing is arranged on each of the walls.

* * * * *